United States Patent
Shimomura et al.

(10) Patent No.: US 7,129,838 B2
(45) Date of Patent: Oct. 31, 2006

(54) VEHICLE INTRUSION MONITORING SYSTEM AND METHOD

(75) Inventors: Toshio Shimomura, Chiryu (JP); Ifushi Shimonomoto, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/972,445

(22) Filed: Oct. 26, 2004

(65) Prior Publication Data
US 2005/0099273 A1 May 12, 2005

(30) Foreign Application Priority Data
Nov. 6, 2003 (JP) ............... 2003-376578

(51) Int. Cl.
*G08B 13/00* (2006.01)

(52) U.S. Cl. .................. 340/541; 340/540; 340/426.1; 340/937; 348/143; 348/148; 348/152

(58) Field of Classification Search ................ 340/541, 340/540, 426.1, 425.5, 937; 348/148, 152, 348/143
See application file for complete search history.

(56) References Cited

U.S. PATENT DOCUMENTS

| | | | | |
|---|---|---|---|---|
| 5,939,975 A | * | 8/1999 | Tsuria et al. ........... | 340/426.18 |
| 6,002,326 A | * | 12/1999 | Turner ..................... | 340/426.1 |
| 6,741,165 B1 | * | 5/2004 | Langfahl et al. ......... | 340/426.1 |
| 6,753,764 B1 | * | 6/2004 | Kuo ......................... | 340/426.2 |

FOREIGN PATENT DOCUMENTS

| JP | A-H11-328545 | 11/1999 |
|---|---|---|
| JP | A-2002-157655 | 5/2002 |
| JP | A-2003-112605 | 4/2003 |

\* cited by examiner

*Primary Examiner*—Tai Nguyen
(74) *Attorney, Agent, or Firm*—Posz Law Group, PLC

(57) ABSTRACT

A vehicle intrusion monitoring system that eliminates unnecessary image capture and transmission by controlling the timing of image capture by a camera installed inside a vehicle. A control ECU in the vehicle intrusion monitoring system issues a first image capture command to a camera triggered by an abnormality detected by a sensor while the system is in watch state. Then, the control ECU issues a second and further image capture commands only when an intrusion detector picks up an intruder inside the vehicle to eliminate unnecessary image capture and transmission.

5 Claims, 3 Drawing Sheets

VEHICLE INTRUSION MONITORING SYSTEM AND METHOD

CROSS REFERENCE TO RELATED APPLICATION

This application is based on and incorporates herein by reference Japanese Patent Application No. 2003-376578.

FIELD OF THE INVENTION

The present invention relates to a system that monitors a vehicle and the like by using a camera to improve its security.

BACKGROUND OF THE INVENTION

A conventional vehicle intrusion monitoring system (for example, JP-A-11-328545) has a camera installed on the vehicle and the like to capture an image of an intruder when the vehicle is trespassed. A user of the system puts the system turned on to be in a watch state when the user leaves the vehicle. If any of the various types of onboard sensors detects an abnormality of the vehicle (opening of a door, break-in from a window etc.), the vehicle intrusion monitoring system captures an image by using a camera based on the assumption that the vehicle is trespassed. The captured image data is then transmitted to a base station.

Further, the other type of vehicle intrusion monitoring system (for example, JP-A-2002-157655) determines a trespassing based only on that a door lock is switched off for the first time, and a room lamp is turned on within three seconds of the switch-off of the door lock, while a watch state of the vehicle intrusion monitoring system is turned on.

However, intrusion detection in the conventional art is not necessarily satisfactory. That is, the camera of the vehicle intrusion monitoring system captures and transmits the captured image data even when an intruder is not in the vehicle, or when the intruder stops robbery on noticing the camera, or when a passer-by casually breaks a window without an intention of intrusion. In those cases, the captured and transmitted image does not provide a clue to the intruder.

As a consequence, the battery of the conventional system runs down by capturing and transmitting unnecessary image data, and incurs unnecessary expenditure on the user of the system when the transmission means uses a subscription service such as a telephone line. Moreover, the unnecessary captured image data is annoying for the user.

Further, the image area captured by the camera is not necessarily limited inside the vehicle, but also includes the outside of the vehicle through side windows, rear windows and the like. Thus, capturing an image of potential intruder around the vehicle by the camera upon detection of an abnormality of the vehicle can improve the usefulness of the vehicle intrusion monitoring system.

SUMMARY OF THE INVENTION

The present invention addresses the foregoing shortcomings in a vehicle intrusion monitoring system and has an object to eliminate unnecessary capturing and transmission of image data.

The present invention has another object to capture, by using a camera, an image of a malicious passer-by who attempts to cause damage to the vehicle from outside (without intrusion).

To achieve the above object, a vehicle intrusion monitoring system includes a system controlling part (a control ECU and a communication ECU) to direct commands and to receive data, a camera to capture an image of an intruder, an intrusion detector and various kinds of sensors to pick up intrusion and damage to the vehicle, and a radio communication device to send the captured images and related information.

The vehicle intrusion monitoring system captures the first image upon detecting the first abnormality after the system is turned on, and then captures the second image only when it detects an intrusion into the vehicle, that is, intrusion into a driver's seat, a passenger's seat, or other compartments of the vehicle. According to this scheme of capturing image, the system can eliminate unnecessary image capturing and transmission, because intrusion into the vehicle is critical in terms of image capturing as evidence collection.

As a variation of above-described operation, the following scheme of operation is proposed. The vehicle intrusion monitoring system is configured to capture images upon receiving an abnormality detection signal coming from predetermined sensors while the system is turned on. This scheme aims at increasing the possibility of image capture area to cover the intruder or the malicious passer-by. The captured images are sent to the control ECU to be combined with the other information such as which camera/sensor being used for the operation.

The captured image by the system is stored in the control ECU, together with the information that specifies more detail regarding the condition of capturing. For example, if there were more than one camera connected to the system, the 'camera-id' that identifies the one used to capture the image will be stored with the captured image. The control ECU will then send, to the owner of the vehicle, a notification that there exists an abnormality of the vehicle by using a radio communication system such as a cell phone. If the owner of the vehicle gives response to the system that he/she would like to see the captured image, the captured image will be sent to the cell phone. However, there is another type of notification that notifies an abnormality of the vehicle without capturing an image, because the system is so programmed to eliminate unnecessary image capturing and transmission. In this case, the notification is either the reason that explains the lack of captured image or just a report of abnormality without explanation of the lack of captured image.

The sensors used with the system may include a door open sensor, a trunk open sensor, a hood open sensor, a glass breakage sensor, and the like. Those sensors may be variably combined to output a signal to the system so that the system can effectively help protect the installed vehicle.

BRIEF DESCRIPTION OF THE DRAWINGS

While the appended claims set forth the features of the present invention with particularity, the invention together with its objects and advantages, may be best understood from the following detailed description taken in conjunction with the accompanying drawings, in which:

DETAILED DESCRIPTION OF THE PREFERRED EMBODIMENTS

Figure 1:
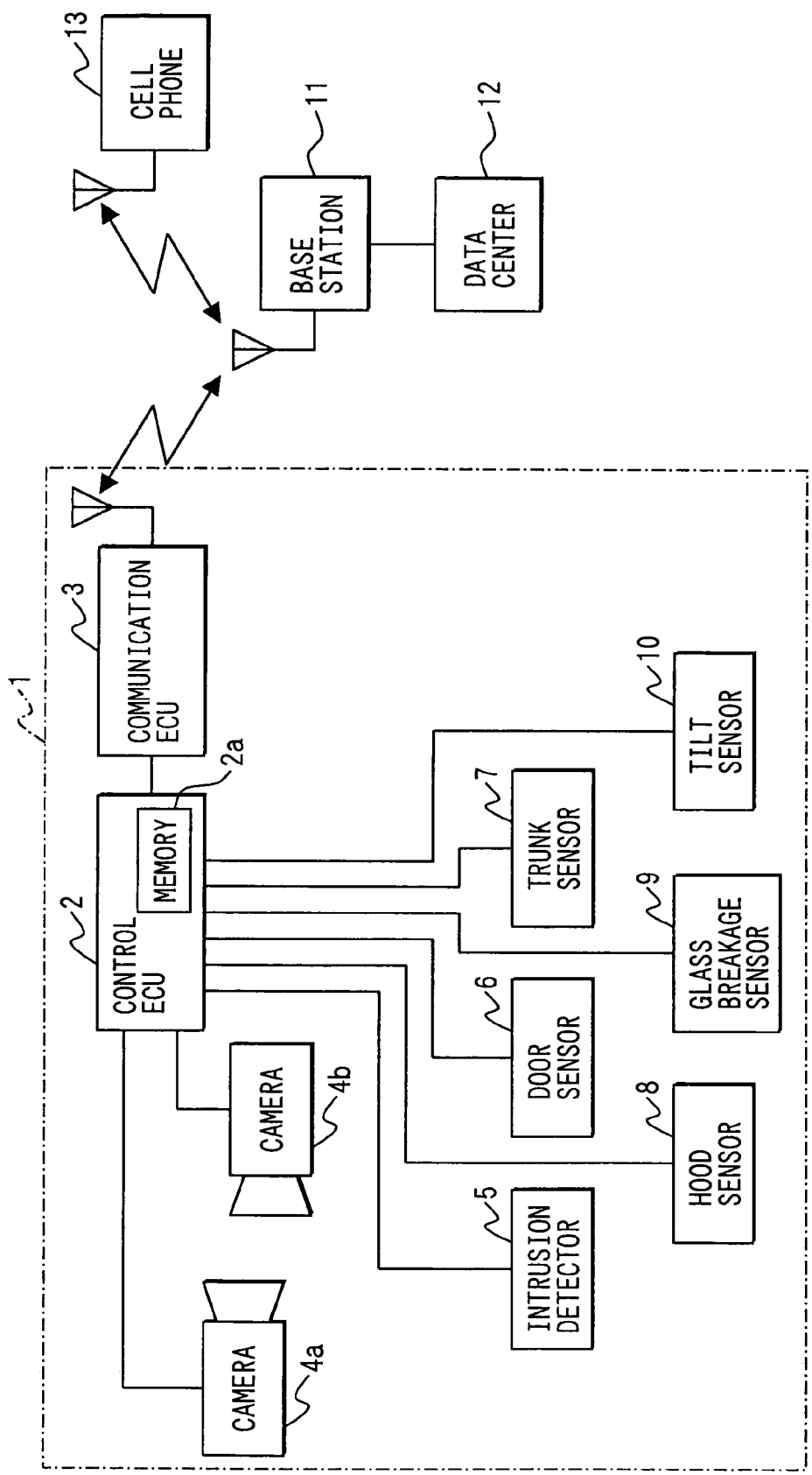
FIG. 1 shows a schematic diagram of a vehicle intrusion monitoring system according to an embodiment of the present invention.

A vehicle intrusion monitoring system includes cameras 4a and 4b as shown in FIG. 1 to capture a still image or a movie (a moving image). The system also includes an intrusion detector 5 that detects an intruder inside a vehicle 1, a door open sensor 6 that detects an abnormal opening of a door (not shown) of the vehicle 1, a trunk open sensor 7 that detects an abnormal opening of a trunk (not shown) of the vehicle 1, a hood open sensor 8 that detects an abnormal opening of a hood (not shown) of the vehicle 1, a glass breakage sensor 9 that detects breakage of a window (not shown) of the vehicle 1, and a tilt sensor 10 that detects the angle of tilt of the vehicle 1. A control ECU 2 that is connected to the camera 4a, the camera 4b, and sensors 5 through 10 by signal wires and controls the camera 4a and 4b based on the signals from the sensors 5 through 10. A communication ECU 3 with an antenna is provided to communicate by radio based on an output from the control ECU 2.

The camera 4a is installed on the front side in the proximity of ceiling in the vehicle 1 pointing towards the rear direction, and the camera 4b is installed on the rear side in the proximity of the ceiling in the vehicle 1 pointing towards the front direction.

Further, the cameras 4a and 4b capture not only the inside of the vehicle 1, but also part of the outside of the vehicle through the windshield, side windows, and the rear window (not shown). That is, the camera 4a captures the side and rear view from the vehicle 1 through the side windows and the rear window, and the camera 4b captures the side and front view from the vehicle 1 through the side windows and the windshield, respectively.

Furthermore, the glass breakage sensors 9 are attached on the windshield, side windows, and the rear window, respectively.

The watch state of the vehicle intrusion monitoring system on the vehicle 1 is turned on when an engine (not shown) is at rest and the door is locked by a genuine key. The door may either be locked by a key-less entry system, a smart card key system, a simple mechanical key or the like. The watch state of the vehicle intrusion monitoring system is lifted when the door is unlocked by the genuine key. The door may either be unlocked by a key-less entry system, a smart card key system, a simple mechanical key or the like.

A base station 11 of a radio wave that communicates with the communication ECU 3 and a cell phone 13 owned by the user of the vehicle 1 is connected to a data center 12. The data center 12 controls data and user information (telephone numbers for the cell phone 13 and the like) to be transmitted by the base station 11.

The cell phone 13 includes a display (not shown) and receives character data and image data (a movie or a still picture) from the base station 11 to be displayed on the display.

When the watch state of the system is turned on, the control ECU 2 outputs the first capture command to the camera 4a or the camera 4b upon detecting any abnormality on the vehicle 1 (mentioned as 'cause for warning' hereinafter) by any one of the sensors 5 through 10. The control ECU 2 chooses a suitable camera based on the contents of the cause for warning. For example, it outputs the capture command to the camera 4b when the glass breakage sensor 9 detects the breakage of the windshield, and thus the front area of the vehicle 1 is included in an image capture area. Or, it outputs the capture command to the camera 4a when the trunk open sensor 7 detects an abnormal opening of the trunk, and thus the rear area of the vehicle 1 is included in an image capture area. Therefore, the person who did a thing to be a 'cause for warning' (mentioned as 'person of action' hereinafter) can be captured through the rear window or the like, and the condition of the vehicle under the attack of the 'person of action' can also be captured. The following description is under the assumption that the trunk open sensor 7 detected an abnormal opening of the trunk.

The control ECU 2 has an internal memory (Not shown in FIGS.) and the memory stores information on the 'cause of warning' (abnormal opening of the trunk in this case) and information on the camera that was the target of the capture command (mentioned as 'camera-id information' hereinafter).

The camera 4a captures an image upon receiving a capture command from the control ECU 2, and transfers the captured image data to the control ECU 2.

The control ECU 2 outputs a transfer command to the communication ECU 3 to transfer a notification signal of occurrence of vehicle abnormality, and also outputs another transfer command to the communication ECU 3 to transfer the 'cause for warning' and the 'camera-id information' stored in the memory.

The communication ECU 3, then, transfers the notification signal, the image data, the 'cause for warning,' and the 'camera-id information' by a radio communication. Upon receiving the above information, the base station 11 sends those data to the data center 12, and then, only the notification signal is transferred to the cell phone 13 carried by a user. Further, the data center 12 records the notification signal, the image data, the 'cause for warning' and the 'camera-id information' sent from the base station 11.

The cell phone 13 that received the above information from the base station 11 notifies reception of the notification signal to the user by a ring tone, a representation on the display of the cell phone 13, a vibration function, or the like.

If the user noticed the above notification signal and requested the image data, the 'cause for warning,' and the 'camera-id information' through a cell phone operation, the base station that received the request retrieves the image data, the 'cause for warning,' and the 'camera-id information' from the storage in the data center 12 and transfers them to the cell phone 13. The cell phone 13 can now display the image data, the 'cause for warning,' and the 'camera-id information.'

After the first capture by the camera 4a described above, the control ECU 2 does not output a capture command to the cameras (the camera 4a and the camera 4b) if a 'cause for warning' was originated from the sensors other than the intrusion detector 5. In this case, the control ECU 2 commands the communication ECU 3 to issue a notification that includes the 'cause for warning' and the omission of camera captured image caused by the source of 'cause for warning' being diverted from the intrusion detector 5 (or, a non-existence of image data).

Besides, the control ECU 2 outputs a capture command to the camera 4a or the camera 4b when the intrusion detector 5 detected an intruder after the first image was captured, and commands the communication ECU 3 to transfer the notification signal, updated capture image data, the 'cause for warning' and the 'camera-id information,' just in the same manner as the first image was taken.

In addition, the transfer process of the notification signal to the user, and how the user receives the image data from the base station 11, are all in the same way as the first image was taken. According to this method, the second capture image and the further one have a higher possibility of having a trace of the intruder to the vehicle 1. As a result, this invention can eliminate an unnecessary image capturing that does not include an image of the intruder, or transfer of unnecessary image data from the above-mentioned type of capturing to the base station 11.

Further, the 'cause for warning' that triggers the first capturing of an image is not necessarily limited to the abnormal opening of the trunk, but any of the abnormality detection information from the various sensors 5 through 10 of the vehicle intrusion monitoring system may be utilized. Furthermore, the other conditions such as, an ignition switch turned on without having a key inserted in the key slot, connection between the battery and the electric devices on the vehicle 1 shut off, or reconnection of a battery once cut off from electric devices, may be regarded as the 'cause for warning.' These conditions may be used as the trigger for the first capturing of an image.

In the embodiment described above, the vehicle intrusion monitoring system uses all types of 'cause for warning' as the trigger for the first capturing of an image and uses only the intrusion detection information from the intrusion detector 5 only as the trigger for the second capturing. However, the image capture timing can be varied by taking other types of abnormality as a predetermined 'cause for warning,' that is, the abnormal opening of the door/trunk of the vehicle, breakage of windshield, or faulty engine start, for example, can be an effective 'cause for warning' and thus can be utilized as the trigger for capturing images regardless of the order of the capturing. This change is made for the purpose of improving the captured image because the image capture area of the camera 4a or 4b can be appropriately linked with the detected signals coming from the sensors located within or close to the image capture area of the camera 4a or 4b. As a result, the captured image has a higher possibility of including the intruder or trace of the intruder.

The vehicle intrusion monitoring system with this type of setting also transfers notification signal that notifies the occurrence of the 'cause for warning' to the base station 11. If the camera has a captured image, the image data is transferred together with the 'cause for warning' that triggered the capturing and the 'camera-id information' while transferring the notification signal. If the camera does not have a captured image, a notification that the omission of camera captured image was caused by the source of 'cause for warning' being diverted from the predetermined one (or, a non-existence of image data) is transferred. The transfer process of the notification signal to the user, and how the user receives the image data from the base station 11, are all in the same way as the above embodiment.

The vehicle intrusion monitoring system described above can capture not only an intruder inside the vehicle, but also the 'person of action' within the image capture area of the camera outside of the vehicle.

Figure 2:
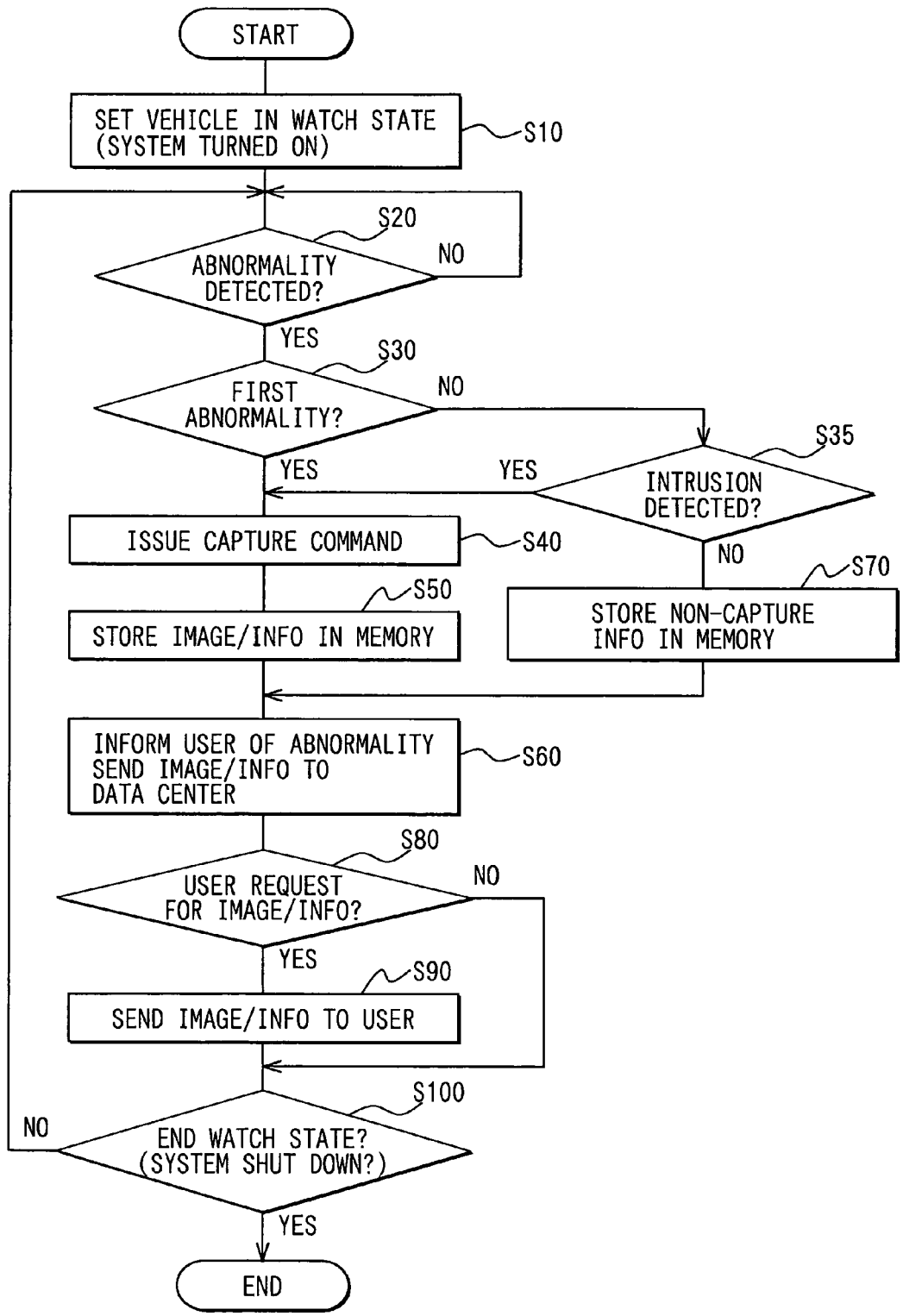
FIG. 2 shows a flow chart of operation of the vehicle intrusion monitoring system.
Figure 3:
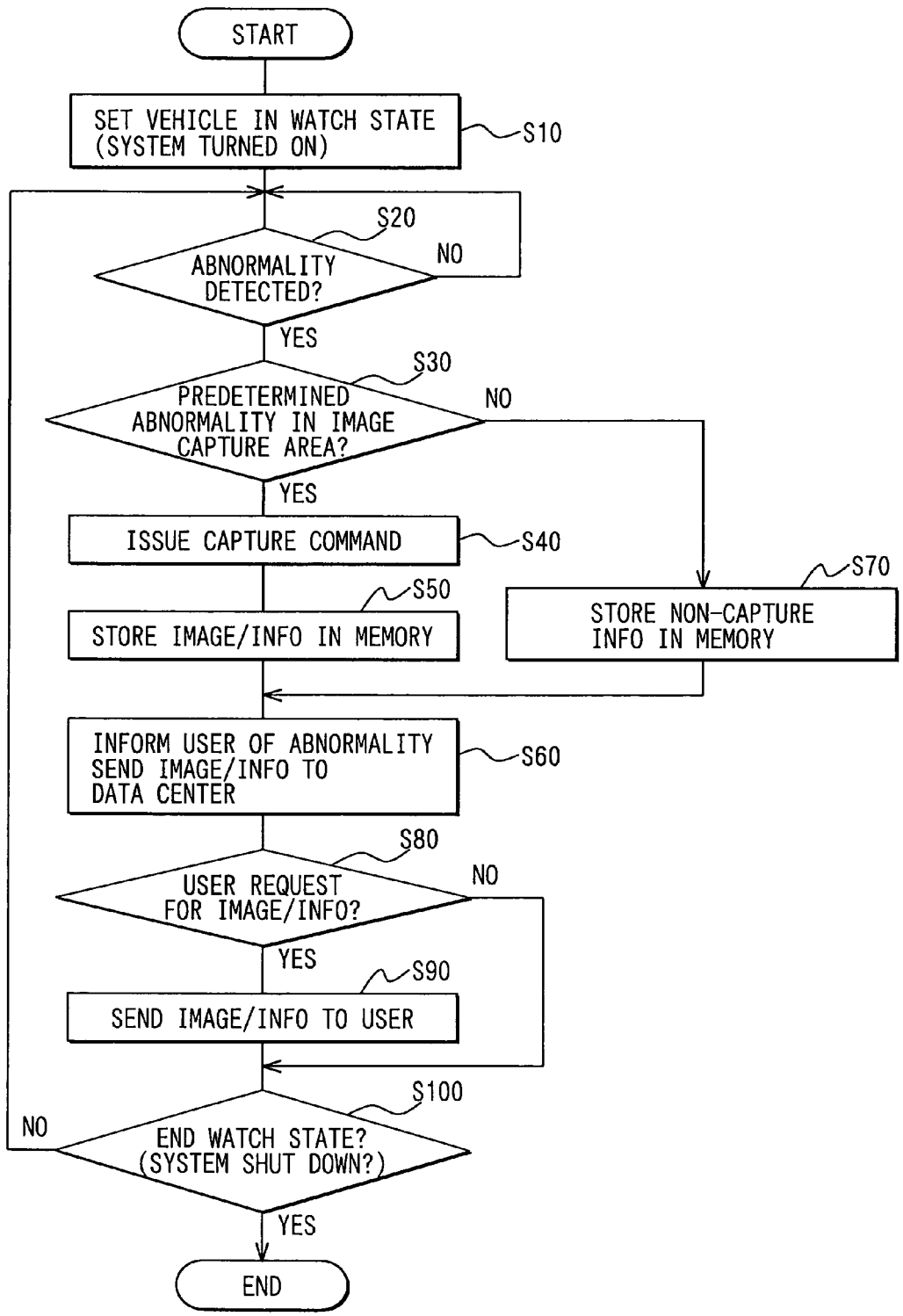
FIG. 3 shows a flow chart of modified operation of the vehicle intrusion monitoring system.

Next, operation of the vehicle intrusion monitoring system is described in detail with respect to two modes based on the flow chart shown in FIG. 2 and FIG. 3.

In one mode (FIG. 2), after the vehicle intrusion monitoring system is turned on as the user locked the vehicle 1 with a key (step S10), it keeps watching out for a signal of abnormality from the sensors 5 to 10 (step S20). When the system detects a signal of abnormality, it determines if the abnormality signal is the first one since the system is turned on (step S30).

If step S30 is YES, the system issues a capture command and data transmission command to the camera 4a or 4b, and store the captured image data in the memory 2a in the control ECU 2 (step S40, S50). If step S30 is NO and an intrusion is detected, that is, the detected abnormality is the second one or later since the system is turned on and the type of abnormality is intrusion (step S35:YES), the system also issues a capture command and data transmission command in the same manner as described above. If the step S30 is NO and the type of abnormality is not the intrusion (step S35:NO), then the system does not issue a capture command and the control ECU 2 stores the information that an image was not captured upon receiving a signal of abnormality (step S70).

In the other mode (FIG. 3), after the vehicle intrusion monitoring system is turned on as the user locked the vehicle 1 with a key (step S10), it keeps watching out for a signal of abnormality from the predetermined combination of sensors 5 to 10 (step S20). When the system detects a signal of abnormality, it determines if the abnormality signal is from the predetermined sensors within the image capture area of the camera 4a or 4b (step S30).

If step S30 is YES, the system issues a capture command and data transmission command to the camera 4a, or 4b, and store the captured image data in the memory 2a in the control ECU 2 (step S40, S50). If step S30 is NO, the control ECU 2 stores the information that an image was not captured upon receiving a signal of abnormality (step S70).

Then, the communication ECU 3 sends a notification of abnormality or a notification of non-image capturing to the owner of the vehicle 1, and in the former case asking if he/she would like to see a captured image or not (step S60). At the same time, the communication ECU 3 sends captured image data to the data center 12 through the base station 11. The data center 12 stores the captured image data with its attributes ('cause for warning' and 'camera-id').

Next, the captured image is retrieved from the data center 12 and delivered to the owner of the vehicle 1 (step S90) if he/she responds to the notification affirmatively (step S80: YES). When step S80 is NO, or after captured image is delivered to the owner (step S90), the system keeps watch state and returns to step S20 unless otherwise instructed (step S100).

The vehicle intrusion monitoring system with the operation described above can capture not only an intruder inside the vehicle, but also the 'person of action' within the image capture area of the camera outside of the vehicle.

The present invention should not be limited to the embodiment previously discussed and shown in the figure, but may be implemented in various ways without departing from the spirit of the invention.

What is claimed is:

1. A vehicle intrusion monitoring system comprising:
   at least one camera on a vehicle;
   an abnormality detection means that at least detects multiple types of abnormalities of the vehicle including presence of an intruder;
   a transmission means that transmits data including captured image data taken by the camera to an external device, outside the vehicle, with wireless communication;
   a control means that outputs a capture command to the camera based on a signal from the abnormality detection means when the vehicle is in a watch state, wherein the control means outputs a transmission command to the transmission means to cause the transmission means to transmit the captured image data acquired by the capture command,
   the control means outputs the capture command for the first time whenever the abnormality detection means detects an abnormality regardless of the type of abnormality after the watch state is set on the vehicle; and subsequent to the capture command being outputted for the first time, the control means outputs the capture command when the abnormality detection means detects an intruder entering the vehicle;

the control means outputs the transmission command to the transmission means when the abnormality detection means detects an abnormality of the vehicle, and the data transmitted by the transmission means includes an indication of omission of the captured image data and a reason for the omission of the captured image data when the control means does not output the capture command to the camera.

2. A vehicle intrusion monitoring system comprising:

at least one camera on a vehicle;

an abnormality detection means that at least detects multiple types of abnormalities of the vehicle, including the presence of an intruder;

a transmission means that transmits a captured image data taken by the camera to an external device outside the vehicle with wireless communication; and a control means that outputs a capture command to the camera based on a signal from the abnormality detection means when the vehicle is in a watch state, wherein the control means has predetermined sets of capture command issuance conditions with regard to the multiple types of abnormalities detected by the abnormality detection means for a first capture command and subsequent capture commands, respectively, the control means outputs the first capture command to the camera only when at least one predetermined set of capture command issuance conditions for the first capture command is fulfilled, and the control means outputs subsequent capture commands to the camera only when at least one predetermined set of capture command issuance conditions for the subsequent capture commands is fulfilled.

3. The vehicle intrusion monitoring system according to claim 1, wherein abnormality identification information that indicates which type of abnormality detected by the abnormality detection means triggered the camera to capture the image is included in the data transmitted by the transmission means.

4. The vehicle intrusion monitoring system according to claim 1 or 2, further comprising:

an additional camera installed on the vehicle, wherein camera identification information, which identifies the camera among those installed on the vehicle that originated the captured image data, is included in the data transmitted by the transmission means.

5. A vehicle intrusion monitoring method, the method comprising:

watching out for an abnormality detection signal from an abnormality detecting means provided in a vehicle;

sending a capture command for a first time to a camera to capture an image when a possibility of an abnormality is detected by the abnormality detecting means;

sending the capture command again to the camera to capture the image only when an intrusion into the vehicle is detected after the capture command has been sent for the first time;

sending notification of the abnormality to a user of the vehicle upon detecting the abnormality;

sending a captured image data to an external device, outside the vehicle, with wireless communication;

receiving a request for the captured image data from the user of the vehicle when the camera captured an image of the abnormality; and sending data of the captured image together with related information to the user of the vehicle.

* * * * *